United States Patent
Jiang et al.

(10) Patent No.: US 10,251,065 B1
(45) Date of Patent: Apr. 2, 2019

(54) METHODS AND APPARATUS FOR INTERFERENCE AWARE SPATIAL REUSE

(71) Applicant: Marvell International Ltd., Hamilton (BM)

(72) Inventors: Jinjing Jiang, San Jose, CA (US); Liwen Chu, San Ramon, CA (US); Yakun Sun, San Jose, CA (US); Lei Wang, San Diego, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 93 days.

(21) Appl. No.: 15/291,818

(22) Filed: Oct. 12, 2016

Related U.S. Application Data

(60) Provisional application No. 62/240,290, filed on Oct. 12, 2015.

(51) Int. Cl.
*H04W 16/02* (2009.01)
*H04W 52/36* (2009.01)
(Continued)

(52) U.S. Cl.
CPC ............ *H04W 16/02* (2013.01); *H04L 45/74* (2013.01); *H04W 52/367* (2013.01); *H04W 84/12* (2013.01)

(58) Field of Classification Search
CPC ... H04W 16/02; H04W 52/367; H04W 84/12; H04L 45/74
See application file for complete search history.

(56) References Cited

U.S. PATENT DOCUMENTS

| | | | |
|---|---|---|---|
| 9,178,593 B1 | 11/2015 | Liu et al. | |
| 2011/0038355 A1* | 2/2011 | Chou | H04W 72/02 370/336 |

(Continued)

FOREIGN PATENT DOCUMENTS

WO   WO 2015/147874 A1   10/2015

OTHER PUBLICATIONS

Itagaki et al., "Dynamic CCA Control and TPC Simulation Results with SS1~SS3," IEEE Draft, IEEE 802.11-15/1045r0 Submission, 54 pages (Sep. 14, 2015).

(Continued)

*Primary Examiner* — Rina C Pancholi

(57) ABSTRACT

A first communication device maintains respective spatial reuse information for respective pairs of second communication devices, the respective spatial reuse information for determining whether the first communication device can simultaneously transmit during respective transmissions between the respective pairs of second communication devices. The first communication device determines whether the first communication device can transmit a spatial reuse transmission to a third communication device simultaneously with one or more ongoing transmissions between one or more pairs of second communication devices using the spatial reuse information. Responsive to determining that the first communication device can transmit the spatial reuse transmission, the first communication device transmits a packet to the third communication device simultaneously with the one or more ongoing transmissions between one or more pairs of second communication devices.

15 Claims, 8 Drawing Sheets

(51) Int. Cl.
*H04L 12/741* (2013.01)
*H04W 84/12* (2009.01)

(56) References Cited

U.S. PATENT DOCUMENTS

2014/0286203 A1* 9/2014 Jindal ................. H04J 11/0026
 370/278
2014/0328270 A1* 11/2014 Zhu ..................... H04W 74/002
 370/329

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers*, Inc., pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Hiertz et al., "The IEEE 802.11 Universe," IEEE Communications Magazine, pp. 62-70, (Jan. 2010).

Seok et al., "HEW PPDU Format for Supporting MIMO-OFDMA," IEEE 802.11-14/1210r0, 16 pages, (Sep. 14, 2014).

U.S. Appl. No. 14/961,558, Chu et al., "Methods and Apparatus for Carrying Out Backoff Operations," filed Dec. 7, 2015.

U.S. Appl. No. 14/963,045, Chu et al., "Methods and Devices for Determining Channel State," filed Dec. 8, 2015.

U.S. Appl. No. 15/335,160, Chu et al., "Backoff Operation in Connection with Spatial Reuse," filed Oct. 26, 2016.

* cited by examiner

METHODS AND APPARATUS FOR INTERFERENCE AWARE SPATIAL REUSE

CROSS-REFERENCE TO RELATED APPLICATION

The present disclosure claims the benefit of U.S. Provisional Patent Application No. 62/240,290, filed Oct. 12, 2015, entitled "Interference Aware Spatial Reuse," the disclosure of which is hereby expressly incorporated herein by reference in its entirety.

FIELD OF THE DISCLOSURE

The present disclosure relates generally to communication networks and, more particularly, to wireless local area networks that utilize spatial reuse.

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PHY) Signal (SIG) field in a PHY header of a PPDU, whereas the BSSID is typically included in a media access control layer (MAC) portion of PPDUs. A device (e.g., an AP or client) in a BSS can determine whether a PPDU is from the BSS to which the device belongs (the "same-BSS") or some other BSS (e.g., an overlapping BSS (OBSS)) by decoding the SIG field and interpreting BSS color bits included therein.

Spatial reuse aims to reduce the "exposed node problem" without significantly aggregating the "hidden node problem." In theory, the "exposed node problem" and the "hidden node problem" cannot be resolved simultaneously, and thus increasing spatial reuse could potentially increase the number of hidden nodes. The "exposed node problem" occurs when transmit-side carrier sensing or receiver-side carrier sensing prevents frame exchange on the links, however the links could still be simultaneously active. In other words, the universal carrier sensing threshold may be too restrictive in the sense that concurrent transmission could still be successful under a certain interference level.

SUMMARY

In an embodiment, a method includes: maintaining, at a first communication device, respective spatial reuse information for respective pairs of second communication devices, the respective spatial reuse information for determining whether the first communication device can simultaneously transmit during respective transmissions between the respective pairs of second communication devices; determining, at the first communication device, whether the first communication device can transmit a spatial reuse transmission to a third communication device simultaneously with one or more ongoing transmissions between one or more pairs of second communication devices using the spatial reuse information; and responsive to determining that the first communication device can transmit the spatial reuse transmission, transmitting, with the first communication device, a packet to the third communication device simultaneously with the one or more ongoing transmissions between one or more pairs of second communication devices.

In another embodiment, an apparatus comprises a network interface device associated with a first communication device, the network interface device having one or more integrated circuit devices. The one or more integrated circuit devices are configured to: maintain respective spatial reuse information for respective pairs of second communication devices, the respective spatial reuse information for determining whether the first communication device can simultaneously transmit during respective transmissions between the respective pairs of second communication devices; determine whether the first communication device can transmit a spatial reuse transmission to a third communication device simultaneously with one or more ongoing transmissions between one or more pairs of second communication devices using the spatial reuse information; and responsive to determining that the first communication device can transmit the spatial reuse transmission, cause the first communication device to transmit a packet to the third communication device simultaneously with the one or more ongoing transmissions between one or more pairs of second communication devices.

In yet another embodiment, a method includes: generating, at a first communication device, a first packet configured to prompt second communication devices to respond to the first packet by reporting respective received power levels at the second communication devices corresponding to receipt of the first packet at the second communication devices; transmitting, with the first communication device, the first packet; responsive to transmitting the first packet, receiving, at the first communication device, a plurality of second packets from the second communication devices, the plurality of second packets including respective received power levels at the second communication devices corresponding to receipt of the first packet at the second communication devices; and storing, in one or more memories of the first communication device, at least some of the respective received power levels for spatial reuse transmission purposes.

In still another embodiment, an apparatus comprises a network interface device associated with a first communication device, the network interface device having one or more integrated circuit devices. The one or more integrated circuit devices are configured to: generate a first packet configured to prompt second communication devices to respond to the first packet by reporting respective received power levels at the second communication devices corresponding to receipt of the first packet at the second communication devices; cause the first communication device to transmit the first packet; responsive to transmitting the first packet, receive a plurality of second packets from the second communication devices, the plurality of second packets including respective received power levels at the second communication devices corresponding to receipt of the first packet at the second communication devices; and store, in one or more memories of or coupled to the network interface device, at least some of the respective received power levels for spatial reuse transmission purposes.

DETAILED DESCRIPTION

In an area with very dense or overlapping BSSs, it is desirable for a communication device (e.g., an AP or client station) in a given BSS to be able to probe or estimate the interference level in the surrounding environment to determine whether simultaneous or concurrent transmission can be accomplished without adversely affecting communications between other devices in one or more other BSS (e.g., without causing an unacceptable level of errors in a transmission).

For a device to accurately make such a determination various information may be needed including, for example, the receiving power of the devices in the OBSS, how the packets transmitted from the other devices occupy the channel, and the like. Based on such information, the device can determine whether or not a simultaneous transmission can be made without disrupting (e.g., breaking) an ongoing transmission between the other devices.

Embodiments of the present disclosure relate to methods and apparatus for performing spatial reuse in an efficient and effective manner. As will be described in greater detail below, successful spatial reuse can be achieved with knowledge of the applicable interference environment, according to some embodiments.

In accordance with at least one embodiment, a communication device probes a network environment to obtain from neighboring communication devices one or more reports indicating levels of activity in the network environment. Such reports may be used, for example, to store and analyze information about interference levels present in the network environment. Based on the information obtained about interference levels in the network environment, the communication device may determine whether simultaneous or concurrent transmission can be made (e.g., whether spatial reuse can be performed) without adversely affecting ongoing communications between a pair of other communication devices (e.g., in an OBSS).

Figure 1:
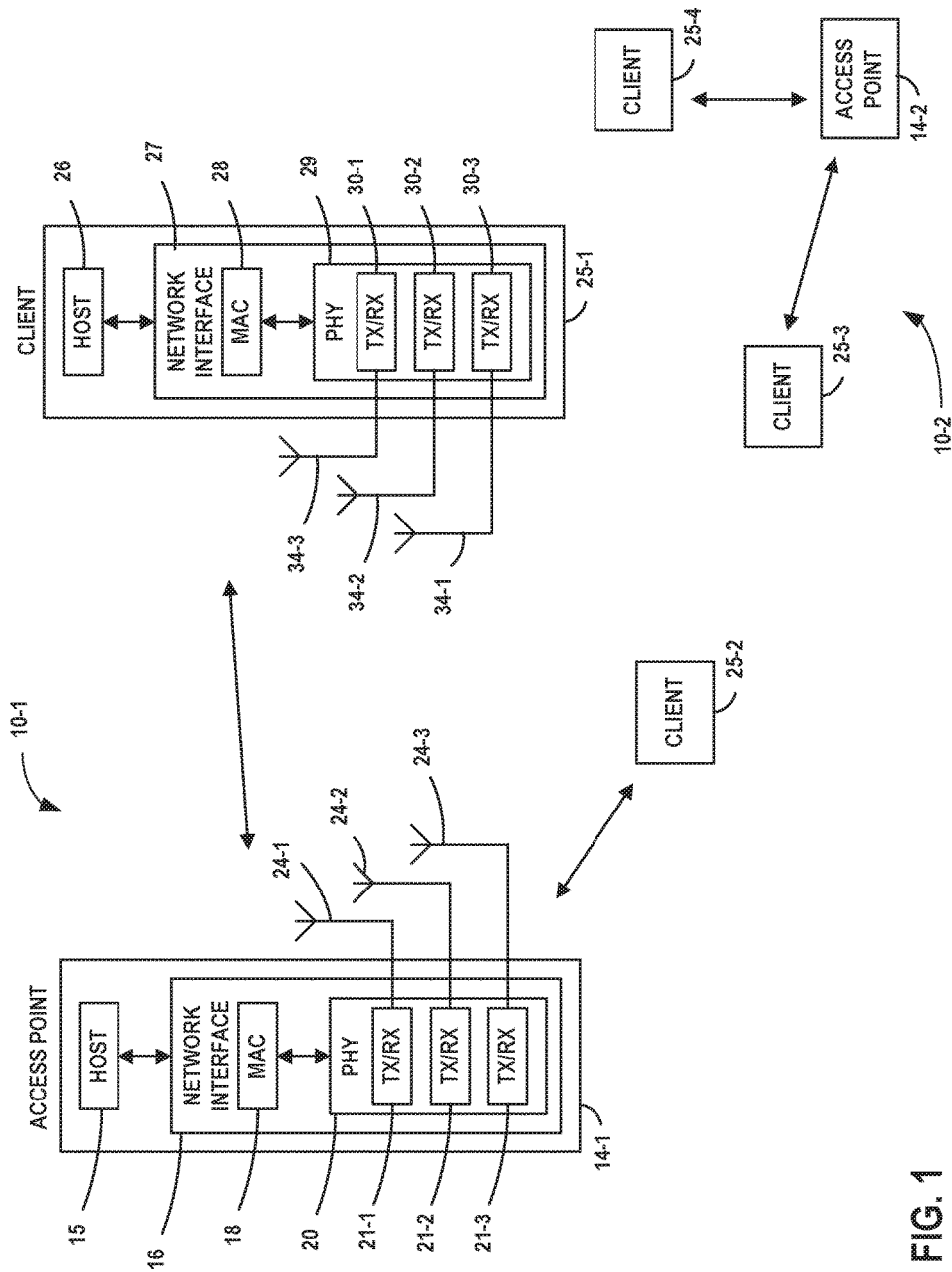
FIG. 1 is a block diagram of an example wireless local area network (WLAN), according to one or more embodiments described herein.

FIG. 1 is a block diagram of example wireless local area networks (WLANs) 10-1 and 10-2, according to at least one embodiment of the present disclosure. The number of WLANs depicted is only intended to be illustrative, and any suitable number may be present. Each WLAN 10 includes at least one AP 14. The configuration of the AP 14 varies among different embodiments, but a typical configuration will now be described, using the AP 14-1 as an example. The AP 14-1 includes a host processor 15 coupled to a network interface device 16. The network interface device 16 includes a MAC processing unit 18 and a PHY processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14-1 includes different numbers (e.g., 1, 2, 4, 5, etc.) of transceivers 21 and antennas 24 in other embodiments. Although AP 14 includes the same number of transceivers 21 and antennas 24, in other embodiments the AP 14 includes a different number of transceivers 21 than antennas 24 and antenna switching techniques are utilized.

In various embodiments, the network interface device 16 is implemented on one or more integrated circuit (IC) devices. For example, in an embodiment, at least a portion of the MAC processing unit 18 is implemented on a first IC device and at least a portion of the PHY processing unit 20 is implemented on a second IC device. As another example, at least a portion of the MAC processing unit 18 and at least a portion of the PHY processing unit 20 are implemented on a single IC device.

Each WLAN 10 includes a plurality of client stations 25. Although two client stations 25 are illustrated in FIG. 1, each of the WLANs 10 includes different numbers (e.g., 1, 2, 3, 5, 6, etc.) of client stations 25 in various scenarios and embodiments.

The configuration of the client station 25 varies among different embodiments, but a typical configuration will now be described, using the client station 25-1 as an example. The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. Although the client station 25-1 includes the same number of transceivers 30 and antennas 34, in other embodiments the client station 25-1 includes a different number of transceivers 30 than antennas 34 and antenna switching techniques are utilized.

In various embodiments, the network interface device 27 is implemented on one or more IC devices. For example, in an embodiment, at least a portion of the MAC processing unit 28 is implemented on a first IC device and at least a portion of the PHY processing unit 29 is implemented on a second IC device. As another example, at least a portion of the MAC processing unit 28 and at least a portion of the PHY processing unit 29 are implemented on a single IC device.

In an embodiment, one or more of the other client stations of the WLANs 10 have a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. These same variations may be present in the client stations 25 of the second WLAN 10-2.

In an embodiment, each AP 14 is configured to operate according to a wireless communication protocol that utilizes Orthogonal Frequency Multiple Division Access (OFDMA) technology and/or multi-user multiple input, multiple output (MU-MIMO) technology.

In an embodiment, each AP 14 (e.g., the network interface device 16 of the AP 14) is configured to transmit independent data simultaneously to multiple client stations 25 via different spatial streams (e.g., downlink (DL) MU-MIMO) and/or via different OFDM sub-channels (e.g., DL OFDMA). In an embodiment, the AP 14 (e.g., the network interface device 16 of the AP 14-1) is configured to receive independent data simultaneously from multiple client stations 25 via different spatial streams (e.g., uplink (UL) MU-MIMO) and/or via different OFDM sub-channels (e.g., UL OFDMA). In some embodiments, two or more of the client stations 25 are configured to receive respective data streams that are transmitted simultaneously by the AP 14 (e.g., DL OFDMA and/or DL MU-MIMO). For example, in one embodiment, the network interface device 27 is configured to receive a data stream among a plurality of independent data streams transmitted simultaneously by the AP 14 to multiple client stations 25 via different spatial streams and/or via different OFDM sub-channels. In other embodiments, two or more of the client stations 25 additionally or alternatively are configured to transmit corresponding data streams to the AP 14 such that the AP 14 receives the data streams simultaneously (e.g., UL OFDMA and/or UL MU-MIMO). For example, in one embodiment, the network interface device 27 is configured to transmit a data stream while one or more other client stations 25 transmit one or more other independent data streams transmitted simultaneously to the AP 14 via different spatial streams and/or via different OFDM sub-channels.

In an embodiment, the AP 14 and the client stations 25 contend for communication medium using carrier sense multiple access with collision avoidance (CSMA/CA) protocol or another suitable medium access protocol. In an embodiment, the AP 14 and the client stations employ a clear channel assessment (CCA) procedure, in which the AP/client station determines the energy level of the medium in order to determine whether the medium is busy or idle. If the medium is idle, the device can transmit. If the medium is busy, the device waits a backoff period and then checks the medium again after the backoff period. A threshold energy level for determining whether the medium is idle or busy may depend upon the bandwidth of the channel being used by the device and on whether the energy corresponds to a transmission that conforms to the wireless communication protocol. For example, according to the IEEE 802.11 Standard, if the channel bandwidth is 20 Megahertz (MHz), the threshold level is −82 decibel-milliwatts (dBm) for energy from valid 802.11 transmissions. For channel bandwidths of 40 MHz, 80 MHz, and 160 MHz, the threshold levels are −79 dBm, −76 dBm, and −73 dBm, respectively. Using these levels for CCA is referred to herein as a "static CCA" procedure. For energy not identified by the device as a valid 802.11 signal, the threshold level is −62 dBm.

In an embodiment, the AP 14 and the client stations 25 may also employ a dynamic CCA procedure. In the dynamic CCA procedure, the AP/client station may use a higher threshold level for valid 802.11 signals from an OBSS as compared to the threshold level for valid 802.11 signals from the same BSS. For example, an AP/client station might deem a 20 MHz channel to be idle if the energy level of an 802.11 signal from another BSS is less than −62 dBm (i.e., the same threshold level as for energy corresponding to signals that are not valid 802.11 signals), but deem the channel to be busy if the energy level of an 802.11 signal from the same BSS is greater than −82 dBm. Thus, an energy level of −70 dBm of a valid 802.11 signal from a different BSS would result in the device determining that the channel is idle, while an energy level of −70 dBm resulting from same-BSS signals would result in the device determining that the channel is busy. Allowing a higher CCA level for transmissions corresponding to another BSS helps to promote spatial reuse between different BSSs, at least in some embodiments and/or scenarios.

Further, in an embodiment, the AP 14 or a client station 25 dynamically selects a bandwidth for a transmission based on channels available for the transmission. In some embodiments, communication between the AP 14 and the client stations 25 can occur in a primary channel of the WLAN 10, in both a primary and a secondary channel of the WLAN 10, exclusively on a secondary channel of the WLAN 10, etc. The AP may assign the primary and the non-primary communication channels in any suitable manner to the one or more client stations, in various embodiments. In an embodiment, the AP 14 is configured to transmit different independent data to different client stations 25 simultaneously by generating an OFDMA data unit that includes different independent data modulated in respective sub-channels of a communication channel. In an embodiment, each sub-channel includes one or more sub-channel blocks, each sub-channel block corresponding to a set of sub-carriers within the OFDMA data unit. In an embodiment, the AP 14 allocates different sub-channels to different client stations and generates the OFDMA data unit such that respective data is modulated in sub-channel blocks corresponding to the sub-channels allocated to the client stations.

Figure 2:
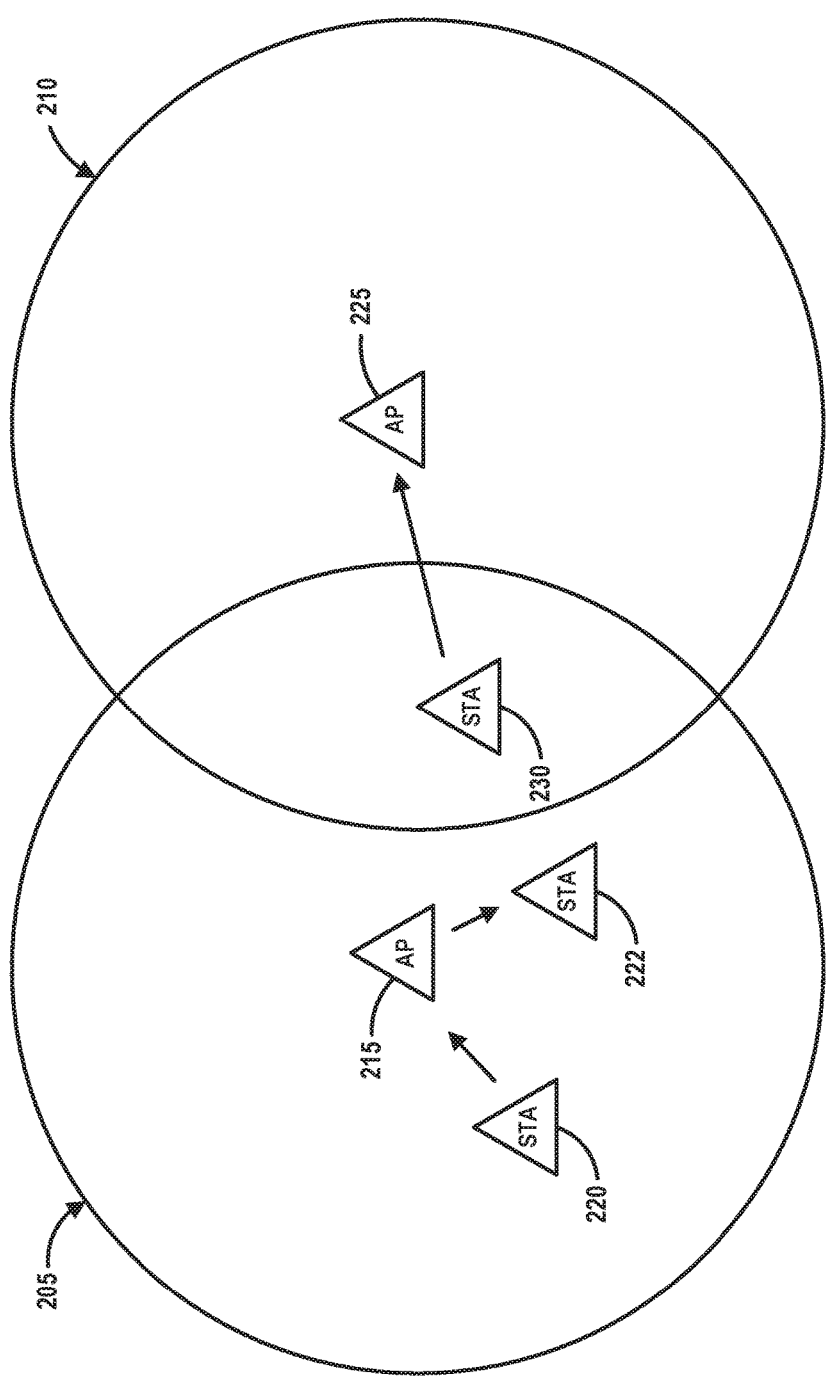
FIG. 2 is a diagram illustrating an example arrangement of overlapping BSS.

FIG. 2 is a diagram of an example arrangement involving overlapping BSSs, where BSS 205 includes AP 215, STA 220, and STA 222, and BSS 210 includes AP 225 and STA 230. In a hypothetical scenario, STA 220 and AP 215 may have ongoing frame exchange. Consider a scenario in which STA 230 has uplink traffic and wants to transmit to the AP 225. When dynamic CCA and BSS color is used, STA 230 raise its CCA level, thus determining that a packet transmitted by STA 220 does not render the channel busy, and transmits to AP 225. However, the transmitted packets of STA 230 could cause strong interference at AP 215 because AP 215 is closer to STA 230 as compared to the distance between STA 220 and STA 230.

Adjusting CCA level simply by checking BSS color of a transmission to figure out whether the transmission is an intra-BSS packet or an inter-BSS packet may cause adverse interference in scenarios such as described with respect to FIG. 2. In the scenario of FIG. 2 described above, it may be preferable for STA 230 to set a network allocation vector (NAV) timer according to the packet transmitted by STA 220 and refrain from transmitting until the NAV timer expires to avoid causing adverse interference at AP 215.

Because different OBSS devices (e.g., STA 220 and STA 222) may experience different levels of interference when STA 230 transmits, an improved technique uses different CCA levels corresponding to different pairs of communication devices. For example, when AP 215 transmits to STA 220, STA 220 will experience weaker interference from a transmission by STA 230, as compared to interference experienced by STA 222 during a transmission from AP 215. Thus, in an embodiment, different CCA levels are utilized by STA 230 depending on whether a transmission is between AP 215 and STA 220 or between AP 215 and STA 222.

Referring again to the example scenario where AP 215 and STA 220, or AP 215 and STA 222, have an ongoing frame exchange, the methods of the present disclosure are designed to determine under what condition or conditions STA 230 can transmit to AP 225 without adversely impacting (e.g., disrupting communication, preventing a receiver from correctly decoding a packet, etc.) transmissions between AP 215 and STA 220 or STA 222.

In accordance with at least one embodiment, STA 230 and AP 225 obtain (e.g., determine, receive, retrieve, etc.) suitable information in order to determine possible interference levels from STA 220, STA 222, and AP 215, as well as possible interference that could be caused to STA 220, STA 222, and AP 215 by STA 230. For example, in various embodiments, the information includes one or more of (i) the receive power at AP 215 of transmissions by STA 220; (ii) the receive power at STA 220 of transmissions by AP 215; (iii) the receive power at AP 225 of transmissions by STA 230; and (iv) the receive power at STA 230 of transmissions by AP 225. In addition, according to some embodiments, the information includes one or both of the transmit power of STA 220 and the transmit power of AP 215. In an embodiment, STA 230 and AP 225 can use the transmit powers of STA 220 and AP 215 to infer the interference power at STA 220 and AP 215 due to transmissions by STA 230 and AP 225 via, for example, channel reciprocity. For example, in an embodiment, STA 230 infers an interference power at STA 220 due to transmissions by STA 230 using the transmit power of STA 220 and a received power level at STA 230.

In accordance with at least one embodiment, the information includes an interference environment quality indicator (e.g., an acceptable CCA level) to sustain successful transmission between STA 220 and AP 215, and, in some instances, a modulation coding scheme (MCS) or other transmission parameters used by AP 215 and STA 220.

With information such as described above, STA 230 and AP 225 determine various suitable parameters for determining when simultaneous transmission (e.g., during an ongoing transmission between AP 215 and STA 220) can occur, and/or characteristics of such simultaneous transmissions, such that the simultaneous transmissions will not cause adverse interference at STA 220 and/or AP 215. For example, STA 230 and AP 225 may determine, based on the information described above, a CCA level, a transmit power, an MCS, and/or other transmission parameters that may be used for simultaneous transmission between STA 230 and AP 225 without causing adverse interference to transmissions between STA 225 and AP 215.

In accordance with at least one embodiment, at least some information utilized by STA 230 and AP 225 to determine acceptable parameters for spatial reuse is obtained through passive listening techniques. For example, the transmit powers of STA 220 and AP 215 are carried in PHY or MAC Headers of a unicast/broadcast packets transmitted by STA 220 and/or AP 215, in some embodiments. In at least one embodiment, MCS or other transmission parameters used by AP 215 and STA 220 are contained in PHY/MAC Headers of packets transmitted by STA 220 and/or AP 215.

In accordance with one or more embodiments, at least some information utilized by STA 230 and AP 225 to determine acceptable parameters for spatial reuse are obtained through active probing of the network environment, as well as active reporting from other communication devices in the network environment. For example, active power probing and reporting techniques are used by a communication device (e.g., STA 230) to determine receive powers for a given TX-RX pair (e.g., transmitting device and receiving device pair) in the network environment. For example, AP 215 determines a receive power at AP 215 of transmissions from STA 220 and broadcasts the receive power so that devices in neighboring networks (e.g., STA 230) can utilize the receive power at AP 215 (due to transmission from STA 220) to determine parameters for simultaneous transmissions. Other communication devices in the network environment may similarly broadcast other relevant information including, for example, the receive power at STA 220 of transmissions by AP 215, the receive power at AP 225 of transmissions by STA 230, and the receive power at STA 230 of transmissions by AP 225. In some embodiments, stations transmit such information to a respective AP by which they are served, and the APs then broadcast the information as discussed above.

In accordance with at least one embodiment of the present disclosure, a communication protocol defines one or more management and/or action frames for exchanging at least some information, such as described above, that can be used to determine parameters for simultaneous transmission (e.g., spatial reuse transmissions). For example, in an embodiment, the communication protocol defines a power probe frame to facilitate exchanging power information among communication devices. For instance, in an embodiment, a power probe frame includes a transmit power indicator that indicates a transmit power of a communication device transmitting the power probe. In some embodiments, the communication protocol also defines a power report frame to facilitate exchanging power information among communication devices. In an embodiment, the communication protocol specifies that communication devices that receive a power probe frame are to transmit a power report frame in response to the power probe frame. In an embodiment, a power report frame includes a received power indicator that indicates a receive power, at a first communication device, of a transmission from a second communication device (e.g., a power probe frame). The first communication device transmits the power report frame to inform one or more other communication devices (e.g., an AP, the second communication device, etc.) of the receive power level, as seen at the first communication device, of a transmission from another communication device (e.g., the second communication device). In some embodiments, the power report frame also includes a transmit power indicator that indicates a transmit power of a communication device transmitting the power report frame.

In some embodiments, the power report frame transmitted by a first communication device includes receive power information corresponding to multiple transmissions from multiple second communication devices. In some embodiments, a client station generates and transmits the power report frame as a broadcast packet (e.g., a packet that is not addressed to a specific communication device but rather includes a broadcast address).

In some embodiments, a client station transmits a power report frame as a unicast packet to an AP with which the client station is associated. The AP receives multiple power report frames from multiple client stations, compiles receive power information received from the multiple client stations (and optionally transmit power information received from the multiple client stations, and transmits a power report frame that includes the compiled information as a broadcast packet, according to an embodiment.

In some embodiments, when a communication device has previously transmitted a power report frame, the communication device is configured to transmit a subsequent power report frame that includes updates to power information included in the previous power report frame. For example, in an embodiment, the subsequent power report frame does not include power information that was included in the previous power report frame and that is unchanged from the previous power report frame.

In some embodiments, a communication device is configured to transmit a power probe frame in response to joining a communication network (e.g., joining a BSS). In some embodiments, a communication device is configured to set a timer (e.g., in response to receiving a power report frame), and to transmit a power probe frame in response to the timer expiring. In some embodiments, a communication device is configured to transmit a power probe frame additionally or alternatively in response to other suitable conditions.

In some embodiments, a communication device is configured to transmit a power report frame in response to receiving a power probe frame. In some embodiments, a communication device is configured to set a timer (e.g., in response to transmitting a previous power report frame), and to transmit a subsequent power report frame in response to the timer expiring. In some embodiments, a communication device is configured to transmit a power report frame in response to determining that the communication device has determined new receive power levels for transmissions from a threshold number of other communication devices since a previous power report frame was transmitted by the communication device. In some embodiments, a communication device is configured to transmit a power report frame additionally or alternatively in response to other suitable conditions.

Using passive listening techniques, actively probing the network environment for receive powers, reporting known receive powers from other active STAs to the network environment, and/or other suitable techniques, STAs in the network environment can collect and store various data that is used to compute spatial reuse parameters. For example, in accordance with at least one embodiment, a given communication device (e.g., AP 225, STA 230, etc.) creates (e.g., build, construct, etc.) and/or maintains a data structure that records information regarding potential interference that may be experienced by other devices in the network environment when the communication device transmits. In an embodiment, the data structure corresponds to an interference graph that records information that is used to determine possible spatial reuse opportunities.

Figure 3:
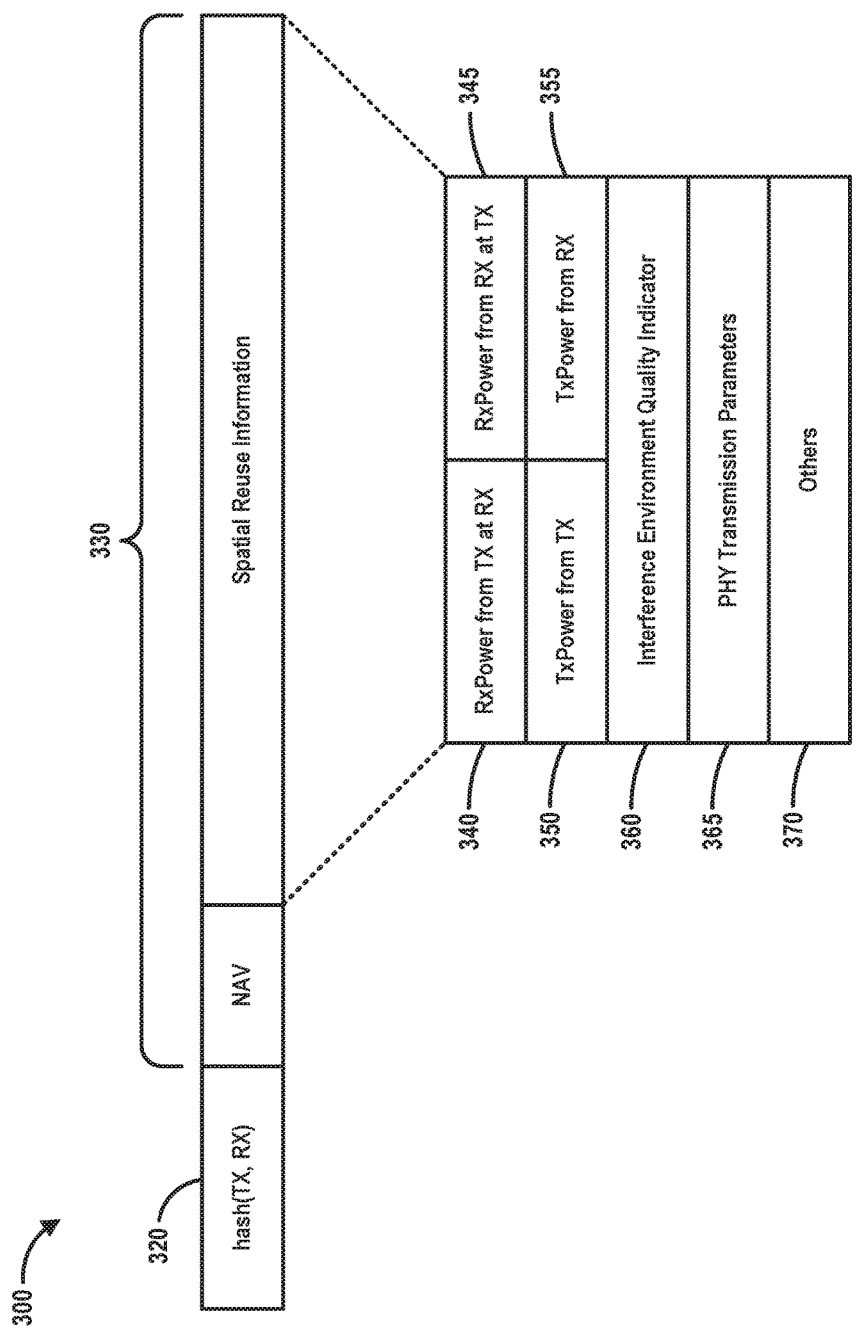
FIG. 3 is a diagram illustrating an example entry in a data structure that stores spatial reuse information, according to one or more embodiments described herein.

In at least one embodiment, a communication device (e.g., an AP, a client device, etc.) may maintain a data structure (e.g., a table) including network allocation vector information (NAVs). FIG. 3 is an example NAV table 300 that may be maintained by a given communication device, according to an embodiment. The NAV table 300 may include entries corresponding to respective TX/RX pairs, in an embodiment. Each entry comprises, for example, a key 320 and spatial reuse information 330. In some embodiments, the key 320 is a suitable identifier of a TX/RX pair. For example, in an embodiment, the key 320 is a hash of a transmitter address (e.g., a MAC address, an association identifier (AID), etc.) and a receiver address (e.g., a MAC address, an association identifier (AID), etc.). Any suitable hash function may be utilized to calculate the hash of the transmitter address the receiver address. In another embodiment, the key 320 is a concatenation of the transmitter address and the receiver address. The spatial reuse information 330 includes a NAV setting (e.g., a NAV timer value, a number of time slots (e.g., each time slot having a suitable time duration such as defined in the IEEE 802.11 Standard), etc.) corresponding to a respective TX-RX pair.

In some embodiments, of the spatial reuse information 330 includes other suitable information associated with the respective TX-RX pair. For example, the interference related information 330 includes one of, or any suitable combination of two or more of: a receive power at the receiving device of transmissions from the transmitting device (RxPower from TX at LX) 340, a receive power of the transmitting device of transmissions from the receiver device (RxPower from RX at TX) 345, a transmit power of the transmitting device (TxPower from TX) 350, a transmit power of the receiving device (TxPower from RX) 355, an interference environment quality indicator (e.g., a power level threshold to use (e.g., a CCA level) when evaluating a transmission between TX and RX) 360, PHY transmission parameters (e.g., MCS being used by TX when transmitting to RX) 365, and optionally one or more other suitable transmissions parameters used by the TX-RX pair 370.

As discussed above, (TX, RX) are address pairs, in some embodiments. Also, according to one or more embodiments, the spatial reuse information (e.g., 340-370) includes any suitable combination of parameters that are helpful in terms of performing spatial reuse. As such, it should be understood that the information included in the example table 300 of FIG. 3 is neither all-inclusive nor exclusive.

When determining whether a spatial reuse transmission can be performed, a communication device analyzes spatial reuse information, such as described above with respect to FIG. 3, that the communication device maintains for respective pairs of other communication devices. For example, when the communication device maintains respective NAV timers for respective pairs of other communication devices, the communication device may determine that a transmission between a pair of communication devices is occurring when the NAV timer for the pair of devices is not expired (e.g., is non-zero), in an embodiment. As another example, when the communication device maintains respective power thresholds (e.g., CCA levels) for respective pairs of other communication devices, the communication device may determine whether a spatial reuse transmission can occur during a transmission between a pair of communication devices based on whether a power level of the transmission between the pair of communication devices meets the power threshold, according to an embodiment. As yet another example, when the communication device determines that a power level of a transmission between a pair of communication devices meets a threshold power level, the communication device may determine that spatial reuse transmission can nonetheless occur based on, for example, receive power level information and/or transmit power level information for the pair of communication devices in the spatial reuse information, according to an embodiment. For example, the communication device may determine that a spatial reuse transmission at a particular power level will not cause adverse interference to a simultaneous transmission between the pair of other communication devices based on spatial reuse information for the pair of communication devices such as receive power level information, transmit power level information, an MCS being utilized by the pair of communication devices, etc., according to an embodiment. As still another example, when the communication device determines that a power level of a transmission between a pair of communication devices does not meet a threshold power level, the communication device may nonetheless not transmit a spatial reuse transmission unless the communication device also determines that the spatial reuse transmission will not cause adverse interference to the transmission between the pair of communication devices based on, for example, receive power level information, transmit power level information, an MCS being utilized, etc., for the pair of communication devices in the spatial reuse information, according to an embodiment.

Figure 4:
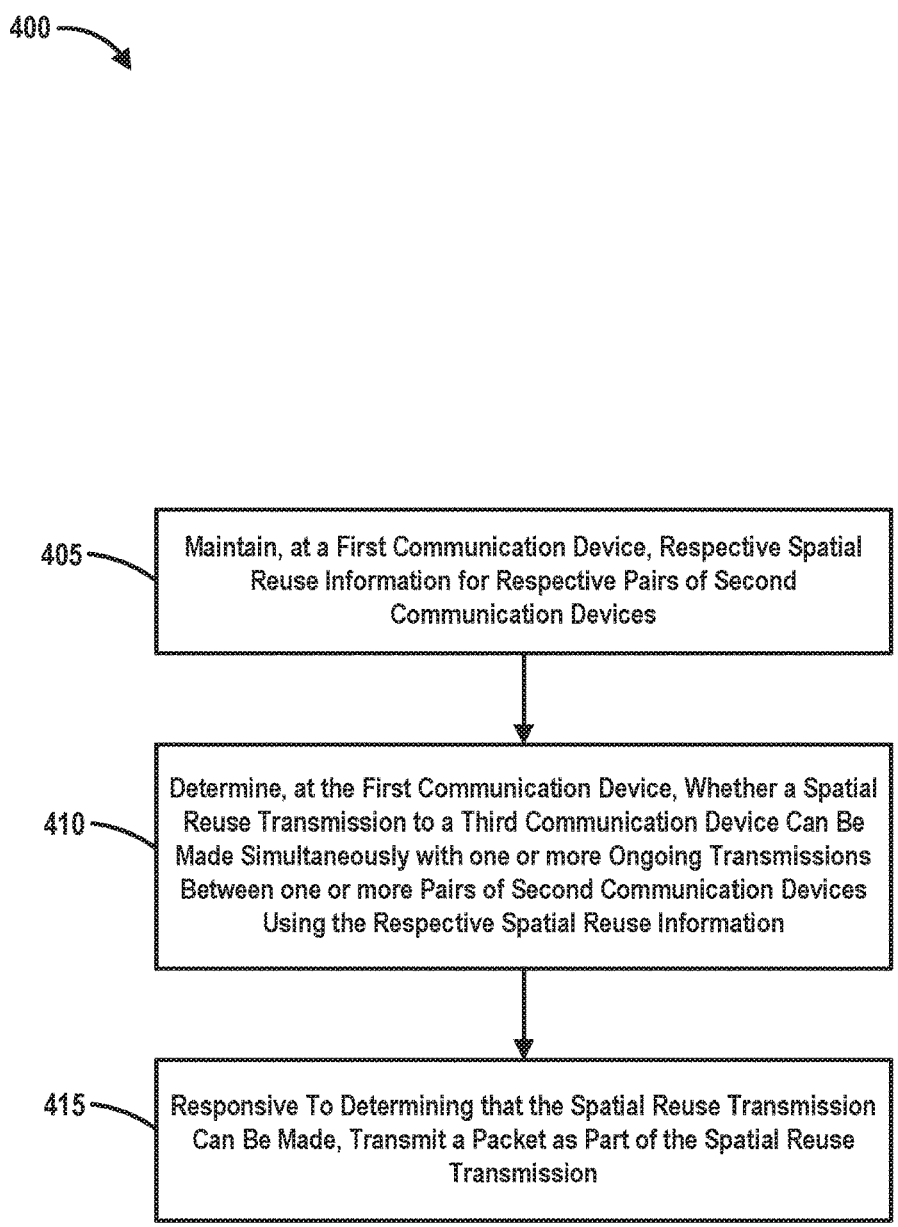
FIG. 4 is a flow diagram of an example method for determining whether to perform spatial reuse, according to one or more embodiments described herein.

FIG. 4 is an example method 400 for determining whether to perform spatial reuse in accordance with one or more embodiments described herein. In some embodiments, the method 400 may be implemented by an access point (e.g., AP 14-1 as shown in FIG. 1). As an example, the network interface 16 may be configured to implement the method 400, according to an embodiment. For instance, the MAC processor 18 may be configured to implement at least a portion of the method 400, according to an embodiment. Similarly, the PHY processor 20 may be configured to implement at least a portion of the method 400, according to an embodiment. As another example, the MAC processor 18 may be configured to implement a first portion of the method 400, and the PHY processor 20 may be configured to implement a second portion of the method 400, according to an embodiment.

In other embodiments, the method 400 may be implemented by a client station (e.g., client station 25-1 as shown in FIG. 1). As an example, the network interface 27 is configured to implement the method 400, according to an embodiment. For instance, the MAC processor 28 is configured to implement at least a portion of the method 400, according to an embodiment. Similarly, the PHY processor 29 is configured to implement at least a portion of the method 400, according to an embodiment. As another example, the MAC processor 28 is configured to implement a first portion of the method 400, and the PHY processor 29 is configured to implement a second portion of the method 400, according to an embodiment.

In other embodiments, the method 400 is implemented by another suitable communication device.

At block 405, a first communication device maintains respective spatial reuse information for respective pairs of second communication devices. In some embodiments, the first communication device is in a first wireless network (e.g., a BSS) and the respective pairs of second communication devices are in one or more second wireless networks (e.g., one or more OBSSs). In some embodiments, one or more of the pairs of second communication devices are in the first wireless network (e.g., the same BSS). In some embodiments, the respective spatial reuse information for respective pairs of second communication devices includes information such as described above with respect to FIG. 3. The spatial reuse information is stored in one or more memory devices in the first communication device (e.g., one or more memory devices included in, or coupled to, a network interface device of the first communication device).

If the first communication device (e.g., a client station, an AP, etc.) has a data packet to transmit to a third communication device, then at block 410 the first communication device determines whether a spatial reuse transmission to the third communication device can be made simultaneously with one or more ongoing transmissions between one or more of the pairs of second communication devices. In an embodiment, block 410 includes using spatial reuse information maintained at block 405.

Responsive to determining, at block 410, that the spatial reuse transmission to the third communication device can be made simultaneously with the one or more ongoing transmissions between the one or more pairs of second communication devices, then at block 415, the first communication device transmits a packet as part of a spatial reuse transmission. In some embodiments, block 415 includes circuitry, a processor, etc., in the network interface device (e.g., in a MAC processor, in a PHY processor, etc.) prompting the network interface device to transmit the packet.

With regard to block 410, in some embodiments, the first communication device determines that the spatial reuse transmission to the third communication device can be made only if the first communication device determines that no adverse interference will occur with respect to any current transmission, known to the first communication device, between any pair of second communication devices for which spatial reuse information is being maintained at block 405.

With regard to block 410, in some embodiments in which the first communication device maintains respective NAV timers for respective pairs of second communication devices, the communication device may use the NAV timers when determining whether one or more transmissions between one or more pairs of communication devices are occurring (e.g., a NAV timer for a pair of second communication devices that is not expired (e.g., is non-zero) indicates an ongoing transmission between the pair), in an embodiment. In some embodiments in which the first communication device maintains respective power thresholds (e.g., CCA levels) for respective pairs of second communication devices, the first communication device may determine whether a spatial reuse transmission can occur during a transmission between a pair of second communication devices based on whether a power level of the transmission between the pair of second communication devices meets the power threshold. For instance, in an embodiment, when a power level of the transmission between the pair of second communication devices does not meet the power threshold (e.g., is below the power threshold), the first communication determines that the spatial reuse transmission will not cause adverse interference to the transmission between the pair of second communication devices.

In some embodiments, when the communication device determines that a power level of a transmission between a pair of communication devices meets the threshold power level, the communication device may determine that spatial reuse transmission can nonetheless occur based on, for example, receive power level information and/or transmit power level information for the pair of communication devices in the spatial reuse information, according to an embodiment. For example, the communication device may determine that a spatial reuse transmission at a particular power level will not cause adverse interference to a simultaneous transmission between the pair of other communication devices based on spatial reuse information for the pair of communication devices such as receive power level information, transmit power level information, an MCS being utilized by the pair of communication devices, a power level to be used by the first communication device for the spatial reuse transmission, an MCS to be used by the first communication device for the spatial reuse transmission, etc., according to various embodiments.

In some embodiments, when it is determined at block 410 that a spatial reuse transmission to the third communication device cannot be made because it is determined that the spatial reuse transmission will cause adverse interference to one or more transmissions between one or more of the pairs of second communication devices, the first communication device waits unit respective one or more NAV timers corresponding to the one or more of the pairs of second communication devices expires, and then make another determination of whether the spatial reuse transmission will cause adverse interference to any transmissions between one or more of the pairs of second communication devices (e.g., at block 410).

Figure 5:
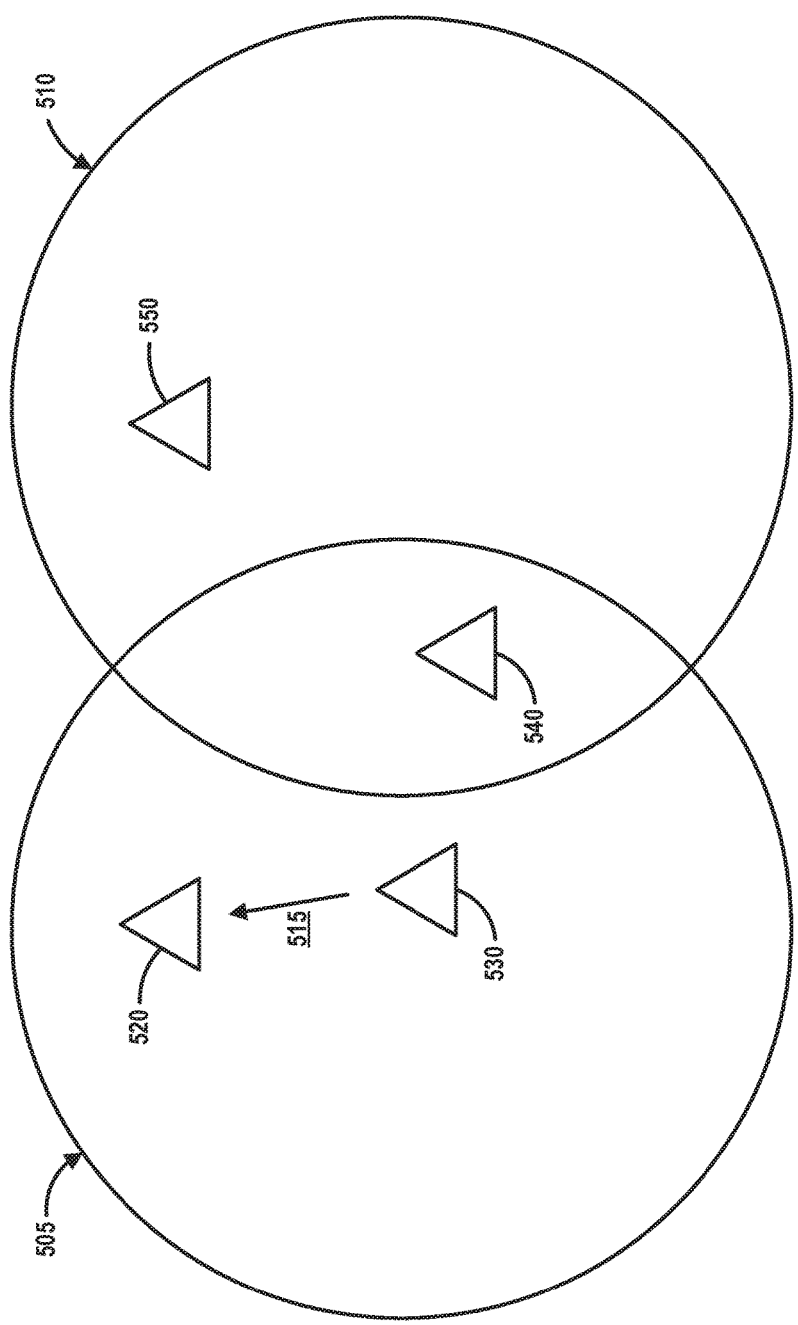
FIG. 5 is a diagram illustrating an example arrangement of overlapping BSSs, where a method for interference aware spatial reuse may be performed, according to one or more embodiments described herein.

FIG. 5 is a diagram of an example arrangement of overlapping BSSs (505 and 510), where one or more embodiments of the methods described herein may be utilized. In the example scenario of FIG. 5, an ongoing transmission 515 is occurring between communication devices 520 and 530 in BSS 505. Communication devices 540 and 550 utilize information included in the ongoing transmission 515 to update spatial reuse information maintained at communication devices 540 and 550, in an embodiment. For example, in an embodiment, the transmission 515 includes a packet having a PHY header and a MAC header. In an embodiment, the PHY header and/or the MAC header includes information that facilitates spatial reuse, such as a transmit power used by communication device 530 for the transmission 515, an MCS used by communication device 530 for the transmission, duration information corresponding to the transmission 515, a power level threshold to use when evaluating the transmission for spatial reuse purposes, etc. Thus, in some embodiments, the communication device 530 is configured to (e.g., a network interface device of the communication device 530 is configured to) include such information (a transmit power used by communication device 530 for the transmission 515, an MCS used by communication device 530 for the transmission, duration information corresponding to the transmission, a power level threshold to use when evaluating the transmission for spatial reuse purposes, etc.) in one or both of a PHY header and a MAC header of the packet 515.

In some embodiments, the communications device 540 and 550 utilize the information included in the ongoing transmission 515 to update spatial reuse information, corresponding to the pair of communications devices 520 and 530, maintained at communication devices 540 and 550. For example, in an embodiment, the communication device 540 utilizes duration information included in the transmission 515 to set a NAV timer. As another example, the communication device 540 utilizes transmit power information included in the transmission 515 to record a transmit power used by communication device 530 when transmitting to communication device 520, according to an embodiment. As another example, the communication device 540 utilizes MCS information included in the transmission 515 to record an MCS used by communication device 530 when transmitting to communication device 520, according to an embodiment. As still another example, the communication device 540 utilizes a power level threshold included in the transmission 515 to record a power level threshold to use when evaluating transmissions between communication devices 520 and 530 for spatial reuse purposes, according to an embodiment.

In some embodiments, a communication device reports information useful for spatial reuse. As an illustrative example, the communication device 520 determines a power level of signals received from communication device 530, and reports the received power level to an access point and/or other communication devices via a unicast frame, a broadcast frame, etc. The received power level is included in a management frame, an action frame, etc., according to various embodiments. In some embodiments, client devices send such reports to an access point with which the client devices are associated, the access point compiles the information, and the access point then broadcasts the compiled information. Other communication devices receive such reports that include the information useful for spatial reuse, and use information in the reports to maintain spatial reuse information for pairs of communication devices such as described above, according to some embodiments.

In some embodiments, a communication device is configured to (e.g., a network interface device of the communication device is configured to) generate and transmit a power probe frame that includes an indication of a transmit power used by the communication device. In some embodiments, other communication devices that receive the power probe frame are configured to update spatial reuse information (e.g., transmit power information) corresponding to the communication device that transmitted the power probe frame. Other communication devices that receive the power probe frame are configured to (e.g., network interface devices of the communication device is configured to) determine respective receive power levels corresponding to receipt of the power probe frame, generate respective power report frames that include the respective indications of the respective receive power levels, and then transmit the power report frames, according to an embodiment. In some embodiments, the respective power report frames are generated to include the respective indications of the respective transmit power levels used to transmit the respective power report frames. In some embodiments, communication devices that receive the power report frames are configured to update spatial reuse information (e.g., receive power information, transmit power information, etc.) corresponding to the communication devices that transmitted the power report frames. In some embodiments, a communication device is configured to (e.g., a network interface of the communication device is configured to) not include spatial reuse information in a power report frame that has not changed since such information was transmitted by the communication device in a previous power report frame.

Figure 6:
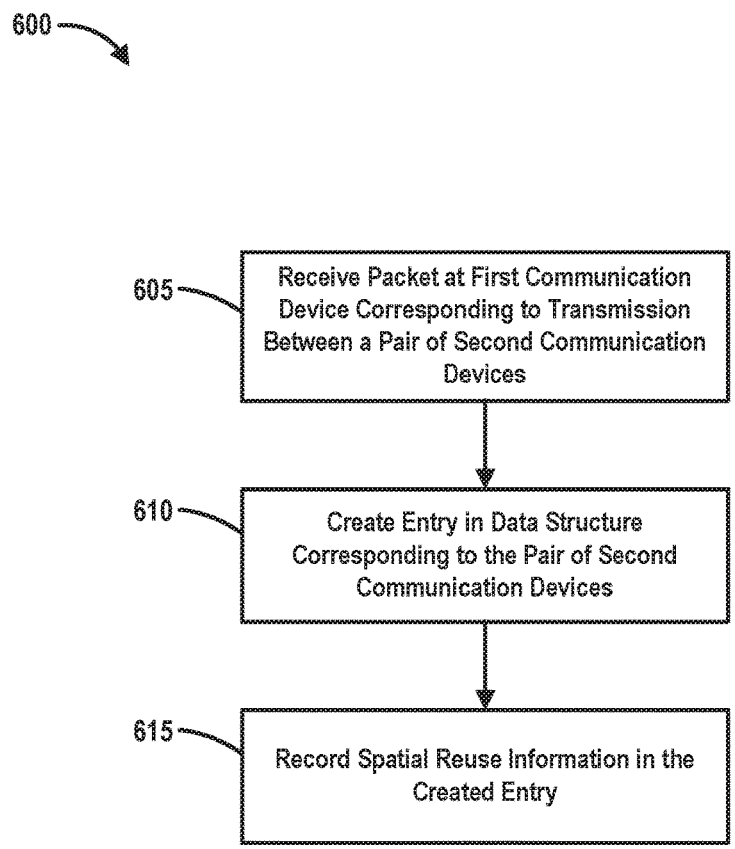
FIG. 6 is a flow diagram of an example method for maintaining spatial reuse information, according to one or more embodiments described herein.

FIG. 6 is a flow diagram of an example method 600 for maintaining spatial reuse information, according to one or more embodiments described herein. In one or more embodiments, the method 600 may be implemented by an access point (e.g., AP 14-1 as shown in FIG. 1). As an example, the network interface 16 may be configured to implement the method 600, according to at least one an embodiment. For instance, the MAC processor 18 may be configured to implement at least a portion of the method 600, according to an embodiment. Similarly, the PHY processor 20 may be configured to implement at least a portion of the method 600, according to an embodiment. As another example, the MAC processor 18 may be configured to implement a first portion of the method 600, and the PHY processor 20 may be configured to implement a second portion of the method 600, according to an embodiment.

In one or more other embodiments, the method 600 may be implemented by a client station (e.g., client station 25-1 as shown in FIG. 1). As an example, the network interface 27 is configured to implement the method 600, according to at least one embodiment. For instance, the MAC processor 28 is configured to implement at least a portion of the method 600, according to an embodiment. Similarly, the PHY processor 29 is configured to implement at least a portion of the method 600, according to an embodiment. As another example, the MAC processor 28 is configured to implement a first portion of the method 600, and the PHY processor 29 is configured to implement a second portion of the method 600, according to an embodiment.

In one or more other embodiments, the method 600 may be implemented by another suitable communication device.

At block 605, a packet is received at a first communication device, the packet corresponding to a transmission between a pair of second communication devices.

At block 610, when the first communication device determines that there is not an existing entry in a spatial reuse data structure (e.g., a table) corresponding to the pair of second communication devices, the first communication device creates an entry corresponding to the pair of second communication devices. On the other hand, if the first communication device determines that there is already an existing entry in the spatial reuse data structure (e.g., a table) corresponding to the pair of second communication devices, block 610 may be omitted.

At block 615, the first communication device records spatial reuse information corresponding to the packet received at block 605 in the entry. The entry has a format the same as or similar to formats described in connection with FIG. 3, in some embodiments. The entry has another suitable format in other embodiments.

In some embodiments, at least some of the spatial reuse information is retrieved from the packet (e.g., from a PHY header of the packet, a MAC header of the packet, etc.). For example, in an embodiment, the packet includes an indication of transmit power level used by a communication device that transmitted the packet. As another example, in an embodiment, the packet includes a power level threshold to be used by other communication devices when performing spatial reuse analyses corresponding to transmissions between the pair of second communication devices. As another example, in an embodiment, the packet includes an indication of an MCS used to transmit the packet.

In some embodiments, at least some of the spatial reuse information is determined by the first communication device based on measurements by the first communication device. For example, in an embodiment, the first communication device measures a receive power level of the packet at the first communication device, and the first communication device stores the receive power level of the packet at the first communication device in the entry. In an embodiment, the first communication device uses the recorded transmit power level and the receive power level of the packet at the first communication device to later estimate a receive power level, at one of the second communication devices (e.g., the device that transmitted the packet, of a transmission by the first communication device (e.g., by assuming channel reciprocity).

In some embodiments, when an entry corresponding to the pair of second communication devices already exists, at least some spatial reuse information in the entry is updated based on spatial reuse information retrieve from, and/or or otherwise determined in connection with receipt of, the packet.

In some embodiments, the method 600 also includes determining whether the packet received at block 605 is addressed to the first communication device (e.g., whether the first communication device is an intended recipient of the packet, whether a receive address in a header of the packet matches an address of the first communication device, etc.), and blocks 610 and 615 are performed in response to determining that the packet is not addressed to the first communication device. In some embodiments, the method 600 includes, determining a transmit power of the packet (e.g., from information included in a header of the packet, based on a received power of the packet and assuming channel reciprocity, etc.), and recording the transmit power and a receive power of the packet in response to determining that the packet received at block 605 is addressed to the first communication device.

Figure 7:
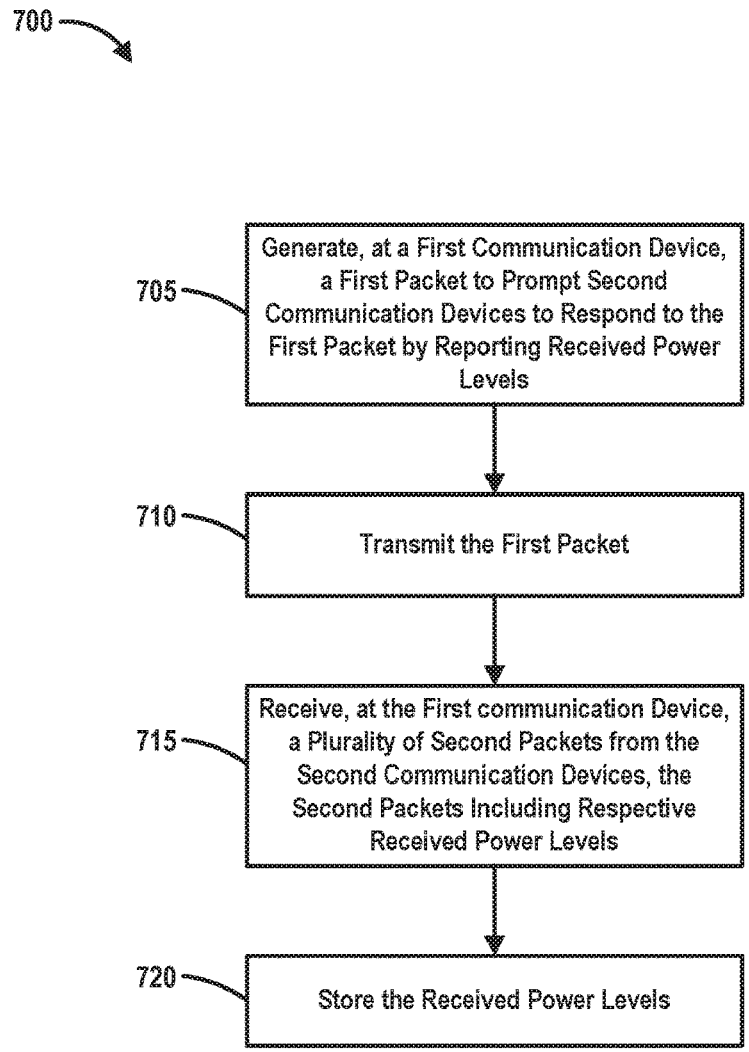
FIG. 7 is illustrating flow diagram of another example method for maintaining spatial reuse information, according to one or more embodiments described herein.

FIG. 7 is a flow diagram of another example method 700 for maintaining spatial reuse information, according to one or more embodiments described herein. In one or more embodiments, the method 700 may be implemented by an access point (e.g., AP 14-1 as shown in FIG. 1). As an example, the network interface 16 may be configured to implement the method 700, according to at least one an embodiment. For instance, the MAC processor 18 may be configured to implement at least a portion of the method 700, according to an embodiment. Similarly, the PHY processor 20 may be configured to implement at least a portion of the method 700, according to an embodiment. As another example, the MAC processor 18 may be configured to implement a first portion of the method 700, and the PHY processor 20 may be configured to implement a second portion of the method 700, according to an embodiment.

In one or more other embodiments, the method 700 may be implemented by a client station (e.g., client station 25-1 as shown in FIG. 1). As an example, the network interface 27 is configured to implement the method 700, according to at least one embodiment. For instance, the MAC processor 28 is configured to implement at least a portion of the method 700, according to an embodiment. Similarly, the PHY processor 29 is configured to implement at least a portion of the method 700, according to an embodiment. As another example, the MAC processor 28 is configured to implement a first portion of the method 700, and the PHY processor 29 is configured to implement a second portion of the method 700, according to an embodiment.

In one or more other embodiments, the method 700 may be implemented by another suitable communication device.

At block 705, a first communication device generates a first packet that is configured to prompt one or more second communication devices to report respective received power levels at the one or more second communication devices of the first packet. In an embodiment, the first packet corresponds to a management frame defined by a communication protocol. In an embodiment, the first packet corresponds to an action frame defined by a communication protocol. In some embodiments, the first communication device generates the first packet to include a transmit power level used by the first communication device to transmit the first packet. For example, the transmit power level is included in a PHY header of the packet, a MAC header of the packet, in an information element included in a payload of the first packet, etc. In some embodiments, the first packet does not include the transmit power level used by the first communication device to transmit the first packet.

At block 710, the first communication device transmits the first packet. In some embodiments, block 710 includes circuitry, a processor, etc., in the network interface device (e.g., in a MAC processor, in a PHY processor, etc.) prompting the network interface device to transmit the packet.

At block 715, the first communication device receives one or more respective second packets from one or more second communication devices. The one or more second packets include respective received power levels at the one or more second communication devices of the first packet. In some embodiments, the one or more second packets also include respective transmit power levels used by the one or more second communication devices to transmit the second packets.

At block 720, the first communication device records spatial reuse information corresponding to the second packets. For example, in an embodiment, the first communication device records the respective received power levels at the one or more second communication devices included in the one or more second packets. In some embodiments, the first communication device records the respective transmit power levels (if included in the one or more second packets) used by the one or more second communication devices to transmit the second packets. In some embodiments, the first communication device records the respective received power levels at the first communication device of the one or more second packets.

In some embodiments, the first communication device generates a third packet that includes at least some of the spatial reuse information recorded by the first communication device in connection with receiving the one or more second packets. In some embodiments, the third packet is a broadcast packet. In some embodiments, the third packet is a unicast packet to an access point that serves a network to which the first communication device belongs. In embodiments in which the first communication device generates the third packet, the first communication device transmits the third packet. In some embodiments, circuitry, a processor, etc., in the network interface device (e.g., in a MAC processor, in a PHY processor, etc.) prompts the network interface device to transmit the third packet.

Figure 8:
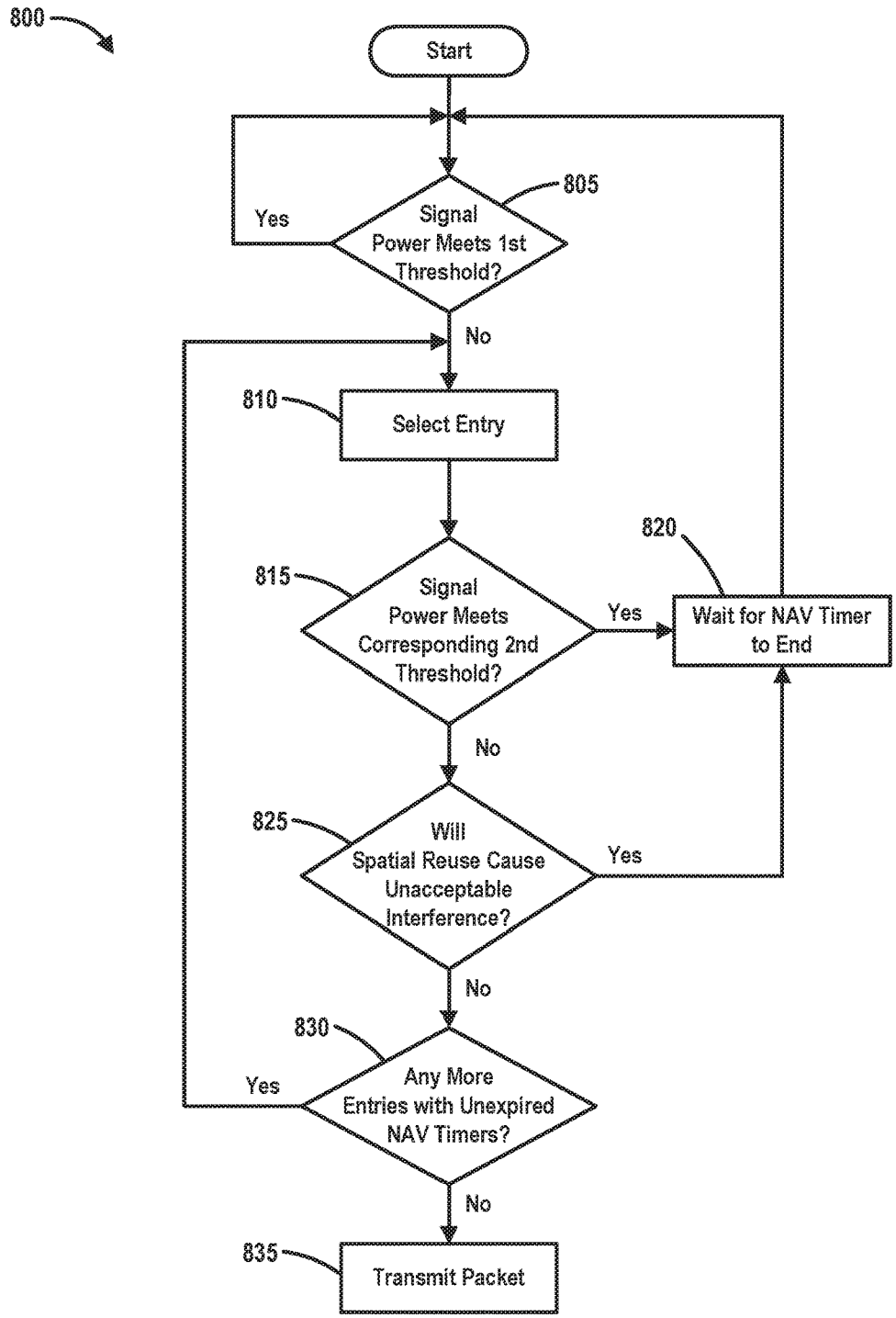
FIG. 8 is a flow diagram of another example method for determining whether to perform spatial reuse, according to one or more embodiments described herein.

FIG. 8 is an example method 800 for determining whether to perform spatial reuse in accordance with one or more embodiments described herein. In some embodiments, the method 800 may be implemented by an access point (e.g., AP 14-1 as shown in FIG. 1). As an example, the network interface 16 may be configured to implement the method 800, according to an embodiment. For instance, the MAC processor 18 may be configured to implement at least a portion of the method 800, according to an embodiment. Similarly, the PHY processor 20 may be configured to implement at least a portion of the method 800, according to an embodiment. As another example, the MAC processor 18 may be configured to implement a first portion of the method 800, and the PHY processor 20 may be configured to implement a second portion of the method 800, according to an embodiment.

In other embodiments, the method 800 may be implemented by a client station (e.g., client station 25-1 as shown in FIG. 1). As an example, the network interface 27 is configured to implement the method 800, according to an embodiment. For instance, the MAC processor 28 is configured to implement at least a portion of the method 800, according to an embodiment. Similarly, the PHY processor 29 is configured to implement at least a portion of the method 400, according to an embodiment. As another example, the MAC processor 28 is configured to implement a first portion of the method 800, and the PHY processor 29 is configured to implement a second portion of the method 800, according to an embodiment.

In other embodiments, the method 800 is implemented by another suitable communication device.

In an embodiment, the method 800 is implemented when a first communication device has a packet to transmit. In an embodiment, the first communication device maintains spatial reuse information such as described above and/or other suitable spatial reuse information. In an embodiment, the first communication device maintains a data structure (e.g., a table) with entries corresponding to pairs of second communication devices.

At block 805, the first communication device determines whether a signal power level meets a first threshold. For example, in an embodiment, the first threshold is set to correspond to a relatively high level of interference. If the first communication device determines that the signal power level meets the first threshold, the first communication device continues monitoring the signal power level. On the other hand, if the first communication device determines that the signal power level does not meet the first threshold, the flow proceeds to block 810. In some embodiments, block 805 also includes determining whether there are any NAV timers (in the spatial reuse data structure) that have expired, and the flow proceeds to block 810 also when the first communication device determines one or more NAV timers have expired.

At block 810, the first communication device selects an entry from the spatial reuse data structure. In an embodiment, block 810 includes selects an entry from the spatial reuse data structure with a corresponding unexpired NAV timer.

At block 815, the first communication device retrieves a second power level threshold from the selected entry, and determines whether the signal power level meets the second threshold. If the first communication device determines the signal power level meets the second threshold, the flow proceeds to block 820, at which the first communication device monitors the NAV timer corresponding to the selected entry, and when the NAV timer expires the flow proceeds to block 805, in an embodiment. In another embodiment, when the NAV timer expires the flow proceeds to block 810.

On the other hand, if the first communication device determines at block 815 that the signal power level does not meet the second threshold, the flow proceeds to block 825. At block 825, the first communication device determines whether the packet can be transmitted without causing unacceptable interference with an ongoing transmission between the pair of second communication devices corresponding to the entry selected at block 810. For example, the first communication device analyzes spatial reuse information in the entry (e.g., transmit power, receiver power, MCS, etc.) to determine whether the packet can be transmitted without causing unacceptable interference with an ongoing transmission between the pair of second communication devices corresponding to the entry selected at block 810.

If the first communication device determines at block 825 that the packet cannot be transmitted without causing unacceptable interference with an ongoing transmission between the pair of second communication devices corresponding to the entry selected at block 810, the flow proceeds to block 820. On the other hand, if the first communication device determines at block 825 that the packet can be transmitted without causing unacceptable interference with an ongoing transmission between the pair of second communication devices corresponding to the entry selected at block 810, the flow proceeds to block 830.

At block 830, the first communication device determines whether there are any unselected entries in the spatial reuse data structure with corresponding unexpired NAV timers. If there are any unselected entries in the spatial reuse data structure with corresponding unexpired NAV timers, the flow proceeds to block 810 at which a next entry with an unexpired NAV timer is selected.

On the other hand, if the first communication device determines at block 830 that there are no unselected entries in the spatial reuse data structure with corresponding unexpired NAV timers, the flow proceeds to block 835. At block 835, the packet is transmitted. In some embodiments, block 835 includes determining transmission parameters to be used when transmitting the packet in order to reduce levels of interference to ongoing transmissions. In some embodiments, block 835 includes determining the transmission parameters using spatial reuse information in the spatial reuse data structure (e.g., table).

At least some of the various blocks, operations, and techniques described above may be implemented utilizing hardware, a processor executing firmware instructions, a processor executing software instructions, or any combination thereof. Examples of suitable hardware include a microprocessor, microcontroller, one or more integrated circuits, one or more application specific integrated circuits (ASICs), one or more field programmable gate arrays, one or more programmable logic devices, etc. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more ASICs, iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

The invention claimed is:

1. A method, comprising:
maintaining, at a first communication device, respective spatial reuse information for respective pairs of second communication devices, the respective spatial reuse information for determining whether the first communication device can simultaneously transmit during respective transmissions between the respective pairs of second communication devices;
determining, at the first communication device, whether the first communication device can transmit a spatial reuse transmission to a third communication device simultaneously with one or more ongoing transmissions between one or more pairs of second communication devices using the spatial reuse information;
responsive to determining that the first communication device can transmit the spatial reuse transmission, determining, at the first communication device, at least one transmit parameter for the spatial reuse transmission, wherein the at least one transmit parameter is determined using the spatial reuse information to reduce interference with the one or more ongoing transmissions between one or more pairs of second communication devices; and
responsive to determining that the first communication device can transmit the spatial reuse transmission, transmitting, with the first communication device, a packet to the third communication device simultaneously with the one or more ongoing transmissions between one or more pairs of second communication devices, wherein the packet is transmitted to the third communication device in accordance with the at least one transmit parameter;
wherein maintaining the respective spatial reuse information for respective pairs of second communication devices comprises generating a hash of a transmitter address and receiver address of a pair of second communication devices, wherein the hash identifies the corresponding spatial reuse information.

2. The method of claim 1, wherein the at least one transmit parameter includes one or both of i) a transmit power, and ii) a modulation and coding scheme (MCS).

3. The method of claim 1, wherein determining whether the first communication device can transmit the spatial reuse transmission includes determining whether a signal power level meets a signal power threshold.

4. The method of claim 3, wherein the power level threshold is specific to a pair of second communication devices.

5. The method of claim 1, wherein the spatial reuse information includes, for each pair of second communication devices, at least one of:
   i) a corresponding timer indicating a remaining duration of an ongoing transmission between the pair of second communication devices, and
   ii) a corresponding power level threshold for analyzing whether a spatial reuse transmission can be made during an ongoing transmission between the pair of second communication devices.

6. The method of claim 5, wherein the spatial reuse information further includes, for each pair of second communication devices, one or more of:
   a receive power at one of the devices of the pair corresponding to a transmission from another device of the pair;
   a receive power at the other device of the pair corresponding to a transmission from the one device of the pair;
   a transmit power of the one device of the pair;
   a transmit power of the other device of the pair; and
   one or more physical layer transmission parameters corresponding to an ongoing transmission between the pair.

7. The method of claim 1, wherein the packet is a first packet, and wherein maintaining spatial reuse information includes:
   in response to receiving a second packet, recording, at the first communication device, i) a transmit power of the second packet, and ii) a receive power of the second packet.

8. The method of claim 7, wherein maintaining spatial reuse information further includes:
   determining, at the first communication device, whether the second packet is addressed to the first communication device; and
   in response to determining that the second packet is not addressed to the first communication device, recording, at the first communication device:
   an identifier of a transmitter of the second packet,
   an identifier of a receiver of the second packet, and
   a modulation and coding schemed (MCS) corresponding the second packet; and
   also in response to determining that the second packet is not addressed to the first communication device, setting, at the first communication device, a network allocation vector (NAV) timer corresponding to i) the transmitter of the second packet and ii) the receiver of the second packet.

9. The method of claim 1, wherein:
   the spatial reuse information includes, for each pair of second communication devices, i) a corresponding timer indicating a remaining duration of an ongoing transmission between the pair of second communication devices, ii) a corresponding power level threshold for analyzing whether a spatial reuse transmission can be made during an ongoing transmission between the pair of second communication devices, and ii) further information regarding communications between the pair of second communication devices;
determining whether the first communication device can transmit the spatial reuse transmission comprises:
  determining, at the first communication device, whether any timers have not yet expired,
  for each timer that has not yet expired,
    determining, at the first communication device, whether a signal power level meets the power level threshold corresponding to the pair of second communication devices,
      if the signal power level meets the power level threshold, determining, at the first communication device, that the first communication device cannot transmit the spatial reuse transmission at least until the timer expires, and if the signal power level does not meet the power level threshold, determining, at the first communication device, whether the first communication device can transmit the spatial reuse transmission using the further information regarding communications between the pair of second communication devices.

10. An apparatus, comprising:
a network interface device associated with a first communication device, the network interface device having one or more integrated circuit devices configured to:
  maintain respective spatial reuse information for respective pairs of second communication devices, the respective spatial reuse information for determining whether the first communication device can simultaneously transmit during respective transmissions between the respective pairs of second communication devices,
  determine whether the first communication device can transmit a spatial reuse transmission to a third communication device simultaneously with one or more ongoing transmissions between one or more pairs of second communication devices using the spatial reuse information,
  responsive to determining that the first communication device can transmit the spatial reuse transmission, determine at least one transmit parameter for the spatial reuse transmission, wherein the at least one transmit parameter is determined using the spatial reuse information to reduce interference with the one or more ongoing transmissions between one or more pairs of second communication devices,
  responsive to determining that the first communication device can transmit the spatial reuse transmission, cause the first communication device to transmit a packet to the third communication device simultaneously with the one or more ongoing transmissions between one or more pairs of second communication devices, and
  cause the first communication device to transmit the packet to the third communication device in accordance with the at least one transmit parameter,
  wherein the one or more integrated circuit devices are configured to generate a hash of a transmitter address and receiver address of a pair of second communication devices, wherein the hash identifies the corresponding spatial reuse information.

11. The apparatus of claim 10, wherein the at least one transmit parameter includes one or both of i) a transmit power, and ii) a modulation and coding scheme (MCS).

12. The apparatus of claim 10, wherein the one or more integrated circuit devices are configured to determine whether a signal power level meets a signal power threshold as part of determining whether the first communication device can transmit the spatial reuse transmission.

13. The apparatus of claim 12, wherein the power level threshold is specific to a pair of second communication devices.

14. The apparatus of claim 10, wherein the one or more integrated circuit devices are configured to maintain spatial reuse information that includes, for each pair of second communication devices, at least one of:
  i) a corresponding timer indicating a remaining duration of an ongoing transmission between the pair of second communication devices, and
  ii) a corresponding power level threshold for analyzing whether a spatial reuse transmission can be made during an ongoing transmission between the pair of second communication devices.

15. The apparatus of claim 14, wherein the one or more integrated circuit devices are configured to maintain spatial reuse information that further includes, for each pair of second communication devices, one or more of:
  a receive power at one of the devices of the pair corresponding to a transmission from another device of the pair;
  a receive power at the other device of the pair corresponding to a transmission from the one device of the pair;
  a transmit power of the one device of the pair;
  a transmit power of the other device of the pair; and
  one or more physical layer transmission parameters corresponding to an ongoing transmission between the pair.

* * * * *